Jan. 17, 1967    W. C. MALLISON ETAL    3,298,793
FLUID BED DIFFUSION

Filed April 4, 1963    3 Sheets-Sheet 1

INVENTORS
WILLIAM CHARLES MALLISON
GEORGE ALBERT RANDALL
PHILIP HENRY SEAVER
WILLIAM CAUBU ROUSSEAU
ROBERT BALDWIN EGBERT

BY *Sol B. Wiaas*

ATTORNEY

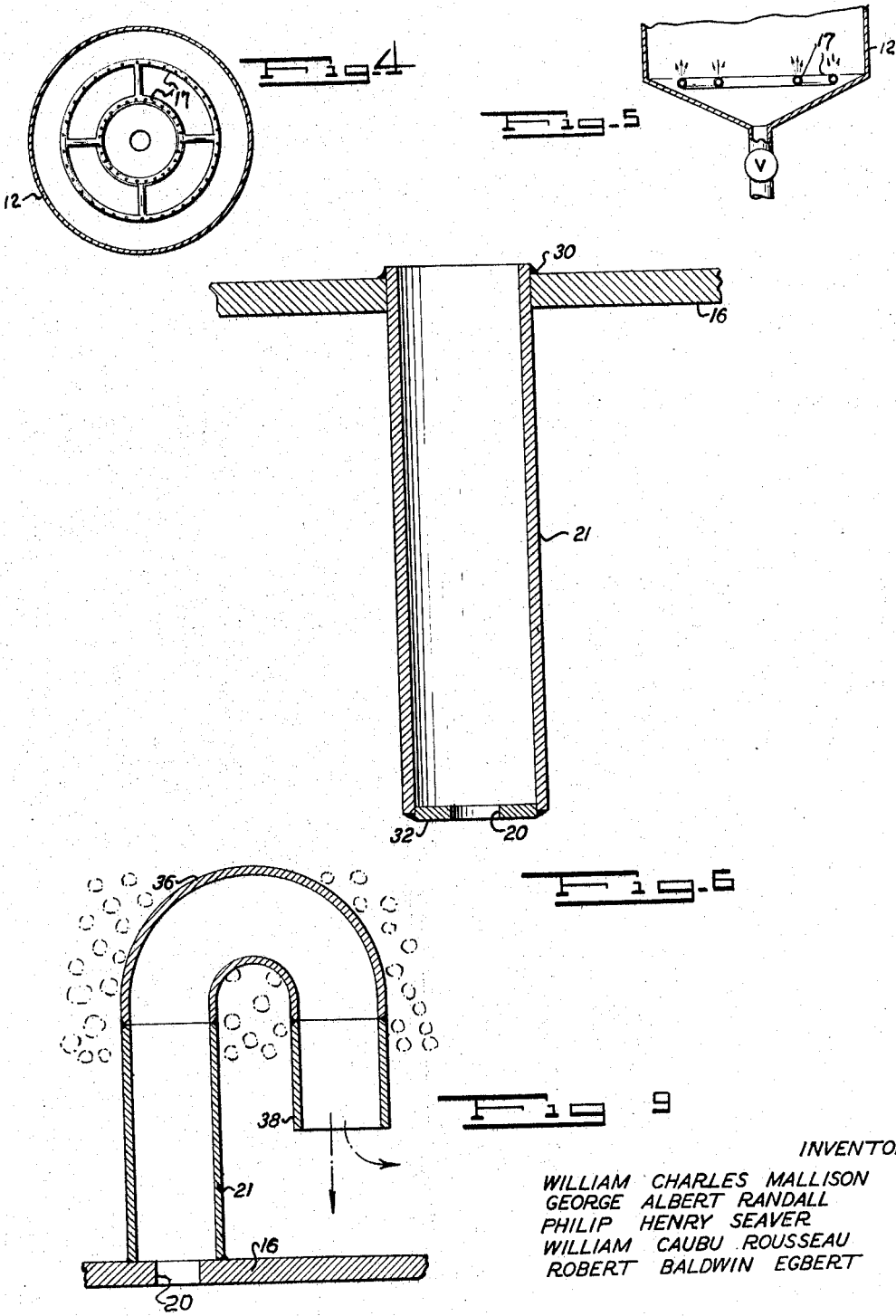

Jan. 17, 1967 W. C. MALLISON ETAL 3,298,793
FLUID BED DIFFUSION
Filed April 4, 1963 3 Sheets-Sheet 3
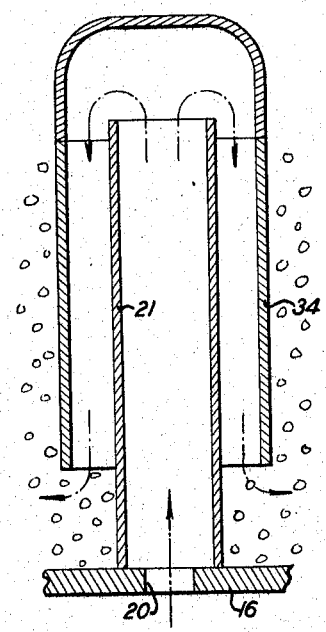
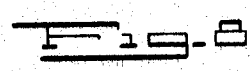
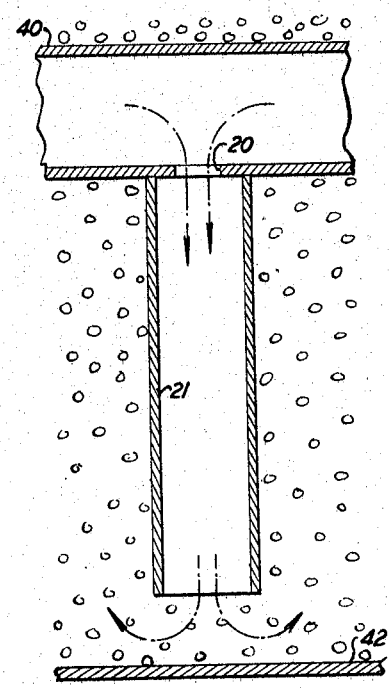
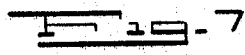
INVENTORS
WILLIAM CHARLES MALLISON
GEORGE ALBERT RANDALL
PHILIP HENRY SEAVER
WILLIAM CAUBU ROUSSEAU
ROBERT BALDWIN EGBERT
BY Sol B. Wiess
ATTORNEY United States Patent Office 3,298,793
Patented Jan. 17, 1967

3,298,793
FLUID BED DIFFUSION
William Charles Mallison, Topsfield, George Albert Randall, Newbury, Philip Henry Seaver, Marblehead, and William Caubu Rousseau, Reading, Mass., and Robert Baldwin Egbert, Stamford, Conn., assignors to The Badger Company, Inc., Cambridge, Mass., a corporation of Massachusetts
Filed Apr. 4, 1963, Ser. No. 270,581
3 Claims. (Cl. 23—288)

This invention relates to a method and means for reducing the rate of attrition of solid particles of catalyst used in fluid bed reactors. More particularly, the invention relates to a method and means for introducing the fluidizing reagent gases into the catalyst at low velocity while maintaining a uniform distribution of flow of gases over the entire cross section of the bed.

Contrary to accepted theory in the art, we have found that little catalyst attrition results within the fluidized body of the catalyst substantially above the zone of entry of reagent gases into the reactor. The major portion of the attrition and size reduction of catalyst results from the action of the gas jetting from the orifice holes in the gas distributing grid plate or sparger, the catalyst particles being picked up and accelerated by the high velocity gas and impinged against the surrounding, comparatively slower moving, particles in high energy collisions, which tends to crush, fracture and/or abrade many of the particles involved.

It is known in the art that substantial lateral pressure variations occur in the lower part of a fluidized catalyst bed depending upon the fluidization characteristics of the catalyst in use, the design or geometry of the bed, the temperature, the gas velocity, bed density, etc., all contributing more or less to such variations in lateral pressures. Recognizing that circumstance, it is common to design reactors with reagent gas inlets in the form of a grid plate having grid holes, through which reagent gases pass upward through the plate penetrating the fluid catalyst; or through spargers comprising networks of perforated ducts disposed in the bottom of the reactor, the spargers also having numerous holes distributed in a pattern to emit jets of reagent gases in a similar distribution, the combined orifice area being small compared to the total cross section of the fluid bed. Such orifice arrangements are designed to produce a pressure drop in the gas upon passing through the orifices usually from two to six times that of the maximum lateral pressure variation expected. For instance, if the maximum expected lateral pressure variation were 0.25 p.s.i. it would be consistent with good practice to set the combined area of the grid hole perforations at a value which will produce a pressure drop of 2 to 6 times this value, i.e. 0.5 to 1.50 p.s.i. Consequently, the orifices are designed to produce a gas velocity based on the hole area in the range of 140 to 225 feet per second, typically about 165 to 200 feet per second. Such high entering velocity, however, results in the undesirable catalyst attrition for the stated reasons. Any direct reduction of that velocity, as by increasing the grid plate perforation area, results in increased flow variation across the reactor cross section which causes poorer reactor performance and, in extreme cases, practical inoperability.

According to this invention we have found the high pressure drop and resulting high velocity through the evenly distributed grid or sparger orifices, known to be necessary for good fluidized reactor performance, may be maintained by reducing the gas velocity before it contacts the catalyst particles of the bed, and while shielding and isolating each inlet reaction gas jet as it enters the fluidized bed from grid plate or sparger perforations, thus reducing the catalyst attrition to a small fraction of that commonly resulting from present practices in the art. Each jet of gas is isolated from the fluidized catalyst in the bed as it enters the reactor and the gas is allowed first to expand, thereby reducing its entering high velocity to one substantially lower before contacting the catalyst. Thus, the entering jet from a grid perforation or a sparger is expanded to reduce its velocity while it is protected from influx of catalyst particles into the jet.

The expansion may be in any direction, for example a vertical direction, and the lowered velocity gas is then contacted with the catalyst vertically, or it may be expanded and then directed in a lateral direction, or the expanded gas may even be led through a 180° reversing turn and be emitted in a downward direction of the bed. The high velocity of the entering jet has served its purpose to reduce lateral variations in the distribution of gas as it enters the reactor in any direction and contacts the bed from any direction, but only after being expanded to a low velocity, thus contacting the catalyst with very low attrition effect.

The invention is further described in conjunction with the several figures of drawings which illustrate the principle of this invention and several means for effecting the result hereof.

FIG. 4 is a plan of a sparger showing distribution of perforations;

FIG. 5 is a vertical section through FIG. 4;

FIG. 6 shows a tube having a closure bored to the size of a typical grid plate perforation, the tube having a diameter enlarged sufficient to slow the velocity as it enters, said tube being supported within a large grid plate support;

FIG. 7 shows a sparging tube having a perforation therein pointed downward of the bed and surrounded by a tube which allows the jet to expand the gases emitted therefrom against an imperforate bottom plate;

FIG. 8 illustrates a tube with the upper end covered by a cap which reverses the flow of entering gas passing it downward toward the bottom of the catalyst bed; and FIG. 9 shows a similar tube surrounding the perforation in the grid plate having its upper end merely bent down to direct the jet downward.

Figure 1:
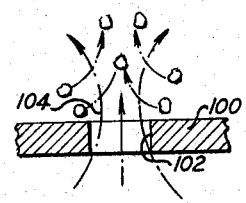
FIG. 1 is a detail illustrating the effect of an unprotected jet entering through a perforation in a grid plate.

Referring first to FIG. 1, a section is shown through the wall 100 of a grid plate or sparger tube having a perforation 102 through which reagent gases pass from one side to the other in the direction of the arrow, being emitted in normal high hole velocity of 140 to 225 feet per second and producing a gaseous jet as it is emitted from the orifice 102 in the general shape as shown. The jet forms a conically shaped cavity in the body of catalyst particles overlying the grid plate 100 and overlying or surrounding the emission side of each gaseous jet. The jet as emitted from the orifice 102 typically narrows just above its base to a smaller diameter neck portion 104 and then fans out as it is distributed or diffused with and diverted both laterally and vertically near the top. This necklike portion commonly referred to as the vena contracta, being constricted in cross-sectional area, is a higher gas velocity portion and consequently has a lower pressure at this point, tending to cause the surrounding catalyst particles to be swept into the base of the jet at the vena contracta, such particles being accelerated to a very high velocity by the entering jet, a catalyst particle velocity far exceeding the normal velocity of movement of particles elsewhere in the bed. These higher accelerated particles are impinged against slow moving particles surrounding the jet with consequent abrasion and fracture to a finer size.

Figure 2:
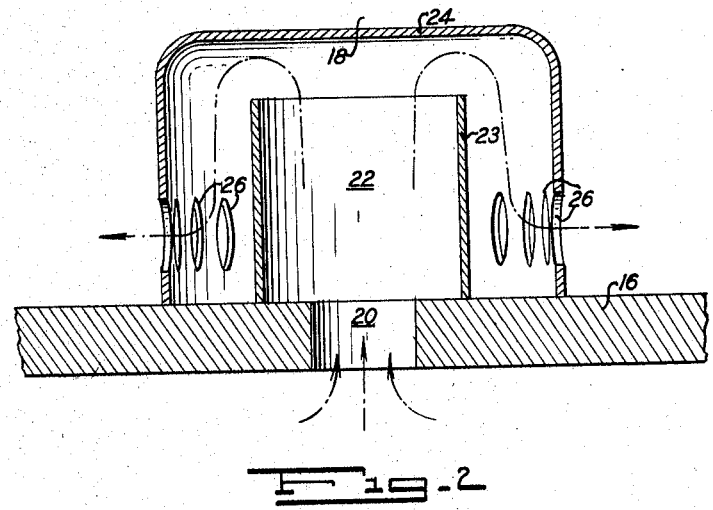
FIG. 2 shows a detail of a grid plate perforation, a bubble cap having lateral perforations and a riser therein.
Figure 3:
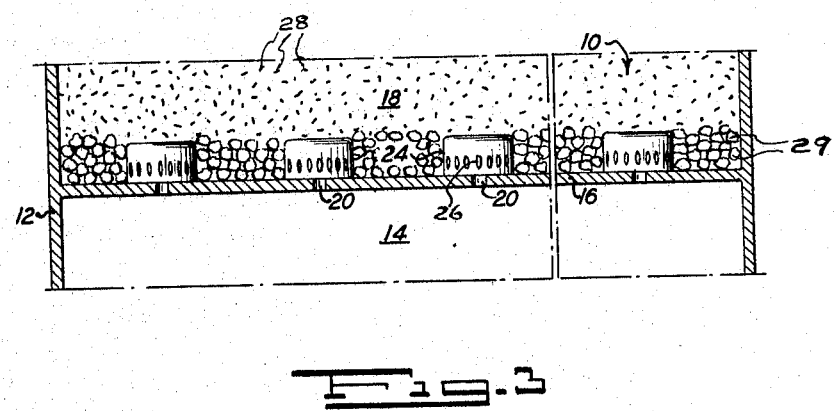
FIG. 3 is a larger view showing a grid plate with numerous bubble caps and perforations there plus the addition of balls.

One construction for slowing the gaseous jet by expansion is shown in FIGS. 2 and 3. A small section of a catalytic reactor 10 is shown in (FIG. 3) having an annular reactor housing wall 12. A lower plenum chamber 14 is disposed, as is conventional, below the catalyst bed 18. The plenum 14 has gas inlet ducts or nozzles (not shown) but which, as is conventional, supply reagent gas at the required temperature, pressure and rate for the intended reaction. The gas presses against the main grid plate 16 above which is supported the bed 18 comprising fluidizable particles 28 of catalyst. The gas enters the reaction chamber contacting the catalyst bed 18 through the several orifices 20, evenly distributed in a pattern across the lateral area of the grid plate 16, passing as a series of high velocity jets upward through the plate 16 into the risers and caps and finally exiting through slots 26 to penetrate and fluidize the catalyst bed 18.

According to the present construction each orifice is surrounded by a riser 23 disposed within a larger diameter cap 24. Riser 23 may extend to a height of about an inch to several inches more or less. The height is enough to extend a substantial distance above the position of several lateral slots or perforations 26 in the surrounding walls of cup 24. This prevents catalyst particles which enter the slot 26 because of low slot pressure drop from being swept into the jet. The jet expansion can and usually does develop both in the riser and continues to expand radially into the annulus surrounding the riser. The gas passes laterally through the several slots 26 with relatively low velocity.

In a preferred construction large protective balls, fragments or pellets 29 are placed as a layer on the bottom of the grid plate covering the slot openings 26 usually by a few inches and of a size too large to enter the openings 26 but to allow free transfer of reagent gases between the balls or pellets 29 and thence up through the catalyst particles 28, disposed above the balls 29 to fluidize the same. The balls may be formed of inert material, resistant to the reaction or to corrosion by the reagent gases at the temperature of the fluidized reaction, and are preferably made of inert ceramic material. They have the further advantage of aiding in the even lateral distribution of the entering gases, further reducing the velocity of the distributed gases. While the bed of larger balls or pellets surrounding the slots 26 need only be deep enough to cover them, they may extend upward to any desired depth such as three inches to nine inches, non-critically, since they have no effect to retard the flow of gas but rather only to distribute it.

While such cap and riser construction is illustrated in FIGS. 2 and 3 upon a grid plate 16, the body 16 may be merely a wall of a large duct 17 of a sparger system, as shown in FIGS. 4 and 5, disposed near the bottom of the reactor through which entering gases to a fluid reactor pass outward into contact with the catalyst particles. Such sparger is mounted upon the bottom plate 42 of the reactor and has numerous gas emitting orifices and each can be surrounded by a riser and cap as shown in FIGS. 2 and 3, and can also have the same type of ceramic balls lying in a layer about the sparger ducts for even distribution of gases, and particularly, to prevent lateral influx of catalyst particles through the slots 26.

According to this invention, another form of device used with great success comprises mounting of a diffusion tube below or above while being fitted into a grid plate 16 or sparger tube 17, as shown respectively in FIGS. 6 and 7. For this purpose the grid plate 16 (or sparger ducts 17) have their usual number of orifices 20 disposed in the same even distribution pattern to have even spacing over the lateral reactor bottom area so that even gas flow distribution through the fluidized catalyst bed is achieved.

In the construction shown in FIG. 6, the diffusion tube 21 is fitted into a correspondingly large bore in the grid plate 16 and welded at 30, and the normally sized orifice 20 is mounted in a small diaphragm or closure plate 32 in the bottom of the diffusion tube 21. The tube 21 extends downward into the plenum chamber 14 of the reactor. In the construction of FIG. 6 the gas enters the tube as the same high velocity jet through the orifice 20 from the plenum 14, and passes upward through the diffusion tube 21 in which it is expanded. The velocity after expansion will be sufficient to prevent catalyst particles from entering in the tube, although the velocity of the gas then passing into contact with the catalyst bed is low and little attrition results.

It may be desirable to direct the flow of entering gases downward toward the grid plate for maximum catalyst contact from the bottom, since catalyst may extend all the way to an imperforate reactor bottom 42 or the grid plate 16. Consequently, since the diffusion tube may extend upward above the plate some distance, as described, the flow of the entering gases being reduced in velocity therein, and prevented from pick up of catalyst particles by the tube walls, the low velocity gases may desirably be returned downward toward the bottom of the reactor; that is, toward the grid plate to prevent gathering of a quiescent layer of catalyst upon the plate about the tubes. Such constructions are shown in FIGS. 7, 8 and 9.

FIG. 8 shows the same diffusion tube 21 mounted about an orifice 20 in grid plate 16, with a cap 34 covering the outlet which reverses the flow of the gas emitted from the tube 21, directing it downward. It will be noted, however, that the cap 34, variously supported to tube 21, baffles and reverses the outward gas flow without interferring therewith, but cap 34 terminates intermediately below the top of the tube 21 and does not contact the upper surface of the grid plate 16, the gas passing outward laterally into the bed as diverted from its downward direction by the grid plate 16.

Similarly, as shown in FIG. 9, instead of using a cap 34 the end of a diffusion tube 21 may be fitted with a return bend tube section 36 which directs the expanded reagent gases in a 180° turn downward through a short tube fitting 38.

FIG. 7 shows a diffusion tube 21 which may be mounted to depend downward about an orifice 20 of a sparger system. It is mounted some distance above the bottom plate 42 of the reactor. Inlet gases pass from the sparger tube 40 through each orifice 20 about which is downwardly fitted the diffusion tube 21, the gases passing outward at their slowed velocity against the bottom plate 42 of the reactor and thence laterally into the catalyst particles for fluidization thereof.

It will be understood that the orifice 20 in the sparger duct 40 may be at the opposite top side and the duct 40 thereby may be disposed closer to the bottom plate 42 of the reactor as in FIG. 7. The diffusion tube 21 vertically surrounding the outlet orifice may extend upwardly from the orifice and be bent into a return bend as shown in FIG. 9, each using a sparger tube 40 as a source of inlet gas as shown in FIG. 7.

Each and any of these constructions are a useful means for expanding the gas entering through each orifice as a high velocity jet for fluidized bed operation, the orifice being surrounded by a diffusion tube to protect it from drawing catalyst particles into the jet and from being accelerated to high attritive and abrasive impact velocity.

In general a fluid bed reactor is designed to have a fluidizing gas velocity in the range of about ½ to 2 linear feet per second. It will have numerous orifices near its bottom emitting reaction gases to provide an overall pressure drop through the orifices of 2 to 6 times the maximum lateral pressure variation in the bed and, for that purpose, would have an inlet bed velocity based on orifice hole area in the range of 140 to 225 and preferably 165 to 200 feet per second, and the attrition is reduced by protecting the entering jet in the catalyst bed until the gas velocity has been substantially reduced. Desirably that reduction of velocity from the given rate exceeding about 140 feet per second is down to below about 50 feet per second, and the issuing velocity preferably is reduced to the range of about 10 to 30 feet per second.

Numerous advantages flow from the construction and operation of a fluid bed reactor operated according to the invention. Fluid bed catalysts for optimum effectiveness in most fluidized catalytic reactions are usually carefully selected to have a desired average particle size including desired distribution of larger and smaller sizes forming such average. No generalization is available to give the best average particle size and distribution of sizes for evenly fluidized reaction since it varies with the catalyst used, reactor design, operating conditions and the like. Suffice it to point out that catalysts are formed specifically each for a purpose and their effectiveness depends not only on their composition and size but also in the distribution of their variously sized components.

For instance, a catalyst may comprise a base having a certain selected porosity due to the manner in which it was formed operating as a carrier with active components deposited on their particle surfaces including mixtures or coatings with promoter substances. After such catalyst is formed as a mixture of desired particle sizes, large and small to form the best average, continued abrasive attrition and fracture due to high velocities of entering jets have the effect upon such fresh catalyst primarily of breaking up larger particles into smaller ones, abnormally raising the quantity of fines and dust at the expense of the larger particles of carefully prepared surface characteristics. Moreover, the surface abrasion of such action oftentimes removes the most active components from the surface of the larger particles, thus not only changing the particle size but largely destroying their initial fresh catalyst activity.

The production of extremely fine particles tends to clog filters when such are used to separate particles from reaction products emitted from the reactor, or extremely fine dust particles formed may not be easily removed from cyclone separators, increasing the handling expense to remove such dust from the reaction products in subsequent purification. Such dust-like particles may have an undesirably high or low catalytic activity to vary the production of the specific reaction product intended and may reduce the efficiency of the reactor by fine dust coating of heat exchange surfaces within the reactor, thereby impairing their efficiency. It is accordingly apparent that the present method and structures which enhance the life of a catalyst bed by reducing attrition very markedly, is a valuable advance in this art.

The following examples illustrate the practice of this invention.

Example 1

An experimental fluid bed reactor of four inches inside diameter was set up so that the attrition produced using several grid plate arrangements with identical catalyst charges could be tested. In each test air at about 400° F. was passed into the reactor which was controlled at a pressure of about 20 p.s.i.g. Air flow rate was identical in each case, and equivalent to a velocity of about 170 feet per second through an orifice of 0.225 inch diameter, based on the orifice area. A ten pound charge of fresh commercially produced fluid bed catalyst was charged to the reactor for each trial. In all tests the catalyst charge came from the same drum which was rolled to insure uniform mixing each time a sample was taken, so that for all practical purposes the catalyst charges for each test were identical.

(A) The grid plate arrangement used as the standard for comparison consisted of a grid plate 3/32 inch thick and having a single 0.225 inch diameter sharp edged orifice located in the center.

(B) Using an identical grid plate and orifice, a bubble cap was brazed to the grid plate concentric with and over the orifice hole. This was a small standard commercial bubble cap formed of stainless steel about 1/16 inch thick and having a diameter of 1¼ inches and a height of 1 inch. The cap was provided with 26 vertical slots of 3/8 inch length around the periphery and having a combined slot area of about 0.2 square inch, which produced slot velocities of about 35 feet per second at the air rate used in the tests.

(C) An identical grid plate-orifice-bubble cap arrangement was made except that the orifice was enlarged to ¼ inch and a piece of thin walled stainless steel tubing having an outside diameter of ¼ inch and an inside diameter of about 3/16 inch was inserted through the orifice hole and brazed to the plate to insure a perfect seal. This tube projected above the grid plate about 7/8 inch, but projected below the cap end only about 1/16 inch, simulating a riser in conventional bubble cap installations.

(D) Finally, the cap-riser arrangement of C was modified by the addition of ½ inch diameter ceramic balls dumped into the reactor to a depth of about 8 inches measured from the grid plate.

An orifice plate as in A was protected by means of ½ inch schedule 40 steel pipe about 4 inches long set up as shown in FIG. 8 as tube 21 with the cap 34 removed. Five tests were run at identical air flow rates and temperatures using the arrangements described, viz., the straight orifice arrangement at an entering air velocity of 170 feet per second based on hole area, the orifice-cap arrangement, the cap-riser arrangement, the cap-riser arrangement with a layer of ceramic balls and the diffusion tube.

The results of the five tests were calculated by comparison of sieve analyses of the catalyst removed from the reactor at the end of each test with the sieve analysis of the common catalyst charge material. These results were scaled up to commercial plant attrition rates on the basis of pounds of air passed through the catalyst per pound of catalyst in the bed, the scaled up result being the attrition which would be expected in a commercial plant in thirty days of operation.

The catalyst charge used in these tests had the following sieve analysis:

| Tyler Sieve Number | Sieve Opening Microns | Percent Sample Retained on Sieve |
|---|---|---|
| 80 | 175 | 36.4 |
| 100 | 143 | 16.9 |
| 150 | 104 | 27.8 |
| 200 | 74 | 13.8 |
| 325 | 43 | 4.2 |
| Pan | 0 | 0.9 |

The projected thirty day commercial plant results of these tests are tabulated below:

|  | Orifice Hole | Orifice* Hole And Cap | Cap With Riser | Cap Riser And Ceramic Balls | Diffusion Tube |
|---|---|---|---|---|---|
| Percent Size Reduction | 40 | 70 | 22 | 13.5 | 10.5 |
| Percent Fines Generation | 31.5 |  | 15.5 | 8.2 | 6.2 |

*After only 24 hours actual test time a small sample of catalyst was removed from the test reactor, microscopic examination of which indicated almost complete destruction. The test was stopped immediately and the catalyst removed from the reactor and sieved. The top of the bubble cap was found to be eroded through completely by the abrasive action of the impinging catalyst. In the standard sieve analysis on this material the great bulk of fines caused blinding of the 325 mesh sieve, so that the analysis was not reliable, the bulk of the fines remaining on the 325 mesh sieve as judged by microscopic examination of this material. The uncorrected sieve analysis showed a per cent size reduction of about 70, which is undoubtedly quite a bit lower than the correct 30 day projection. Since this result was so completely decisive, no attempt was made to repeat the sieve analysis.

There is substantial improvement produced by the cap-riser arrangement and further improvements resulting from using the bed of ceramic balls. The best result was obtained with the diffusion tube. Actually, the improvement introduced by the last three arrangements is much greater than is indicated by the simple ratios of the numbers in the table, since under given conditions the attrition rate of a catalyst drops off markedly as the attrition process proceeds. On the basis of correlations of such data on the particular catalyst used, it can be estimated that the times required to produce a 40% size reduction would be about four months for the cap-riser arrangement and about one year for the cap riser arrangement with the bed of ceramic balls, and more than two years for the diffusion tube.

*Example 2*

A commercial phthalic anhydride plant was built in which the cap and riser arrangement was used on the grid plate. Data from this plant during start-up showed the catalyst over the first 90 day period had sustained a 29% size reduction and the increase in fines amounted to about 21%. In another plant of similar design, except that the grid plate was provided with standard orifice holes, and charged with the same commercial catalyst, the catalyst was found to have sustained a 57% size reduction in the first 90 days with an increase in fines content of about 45%. It is estimated that the plant equipped with the caps and risers would require about two years to attrite the catalyst charge to this extent.

*Example 3*

A commercial fluid bed phthalic anhydride plant having a grid plate with orifice holes was shut down and the grid plate was altered to correspond to the diffusion tube arrangements as shown in FIG. 6, and it was started up with a charge of fresh catalyst for this test. Prior operation of this plant resulted in excessive fines generation.

After start-up, it soon became evident that the attrition rate was extremely low. Since the initial catalyst did not contain enough fine material to produce good fluidization, new catalyst was ground very finely in a commercial grinding mill and added to the reactor after thirteen days operation. This produced the fluidization qualities required and the reactor operated properly for a period of several months. It was observed for this test that little further increase in fines was noted.

Sieve analyses on the initial catalyst charge and of a reactor catalyst sample immediately before the addition of fines are as follows:

| Sieve No. | Approx. Sieve Opening Microns | Start-up | Percent Retained on Sieve After 13 Days |
|---|---|---|---|
| 80 | 177 | 41.6 | 38.4 |
| 100 | 149 | 8.2 | 6.8 |
| 200 | 74 | 41.0 | 46.3 |
| 230 | 62 | 6.2 | 5.6 |
| Pan | ---------- | 3.0 | 2.9 |

The slight reduction shown in the percent of the catalyst smaller than 74 microns in the 13 day sample is believed due to an elutriation effect in the reactor, which effect resulted in the sample having a smaller percentage of fines than a strictly representative sample would contain. Experience on similar reactors has shown that the sample taken under these conditions may be as much as 2% to 3% low on fines.

Analysis of the sieve data, as is, shows a size reduction of about 7% in 13 days, apparently due mostly to splitting of larger particles (common in fresh ground catalysts where large particles may have incipient fractures from the grinding process). Even allowing a large correction for elutriation effects, it is seen that the fines generation rate is extremely small for a new catalyst. Data available from a plant having a reactor of substantially identical design except that it had a standard grid plate with orifice holes produced an attrition rate higher by orders of magnitude, viz., a percent size reduction of about 29, with about 22% increase in fines in the first 13 days of operation.

Various modifications will occur to those skilled in the art. Accordingly, it is intended that the description given herein be regarded as exemplary and not limiting except as defined in the claims appended hereto.

We claim:
1. Catalytic reactor having a bottom plate comprising a housing enclosing and supporting a bed of catalyst fluidizable by passage of gas upwardly therethrough, a sparger mounted above said bottom plate, said sparger comprising a manifold disposed horizontally across the lower end of said catalyst bed above said bottom plate having an inlet connected to a source of fluidizing gas and numerous equally-sized outlet openings evenly distributed in a pattern, each outlet opening in said manifold having a nozzle supported thereabout, each said nozzle having a larger diameter than said opening whereby high velocity gas entering said nozzle from the opening is expanded to reduced velocity in said nozzle, the outlet of each nozzle being positioned to direct the evolved lower velocity gas in fluidizing contact with said bed at the top of said bottom plate.

2. A catalytic reactor comprising a housing enclosing a bed of catalyst fluidizable by passage of gas upwardly therethrough, a substantially horizontal grid plate mounted across said housing above its lower end supporting said bed of catalyst thereon and a plenum enclosed by the lower end of said housing extending substantially below said grid plate, means for introducing a fluidizing gaseous stream into said plenum and thence upward through said grid plate to fluidize the catalyst, said grid plate having numerous equally-sized openings disposed evenly distributed in a pattern across the grid plate through which the gaseous stream passes, each opening having a nozzle supported by said grid plate, said nozzle having a constricted orifice at the inlet end thereof, each nozzle being of substantially larger diameter than said inlet orifice, whereby high velocity gas entering the inlet of each nozzle is expanded therein to substantially reduced velocity before contacting catalyst, each nozzle being supported by and extending upward from the grid plate, each nozzle being bent with a return bend at the outlet directing the gas flow downward upon the grid plate.

3. A catalytic reactor comprising a housing enclosing a bed of catalyst fluidizable by passage of gas upwardly therethrough, a substantially horizontal grid plate mounted across said housing above its lower end supporting said bed of catalyst thereon and a plenum enclosed by the lower end of said housing extending substantially below said grid plate, means for introducing a fluidizing gaseous stream into said plenum and thence upward through said grid plate to fluidize the catalyst, said grid plate having numerous equally-sized openings disposed evenly distributed in a pattern across the grid plate through which the gaseous stream passes, each opening having a nozzle supported by said grid plate, said nozzle having a constricted orifice at the inlet end thereof, each nozzle being of substantially larger diameter than said inlet orifice, whereby high velocity gas entering the inlet of each nozzle is expanded therein to substantially reduced velocity before contacting catalyst, each nozzle extending upward from the grid plate, each nozzle outlet end being fitted with a cap having side perforations which first direct outlet gas downwardly and then laterally from said side perforations to evolve the gas near the top surface of the grid plate, and non-fluidizably large, discrete bodies being distributed as a layer resting upon said grid plate at least to the height of said side perforations through which the evolved gas passes easily laterally, and thence upwardly through the catalyst bed.

References Cited by the Examiner

UNITED STATES PATENTS

| | | | |
|---|---|---|---|
| 2,039,904 | 5/1936 | Hill. | |
| 2,143,015 | 1/1939 | Kleinschmidt | 261—114 X |
| 2,607,662 | 8/1952 | Huff | 23—284 X |
| 2,798,030 | 7/1957 | Hettick et al. | 23—288 X |
| 2,841,476 | 7/1958 | Dalton | 23—284 |
| 2,853,370 | 9/1958 | Downing | 23—288 |
| 2,892,262 | 6/1959 | Shirk | 23—288 X |
| 2,905,634 | 9/1959 | MacLaren et al. | 23—288 X |
| 2,957,757 | 10/1960 | Coates et al. | 23—284 |
| 2,965,454 | 12/1960 | Harper | 23—288 |
| 3,053,642 | 9/1962 | Huntley et al. | 23—288 |

FOREIGN PATENTS 717,851  2/1942  Germany.

MORRIS O. WOLK, *Primary Examiner.*

J. SCOVRONEK, *Assistant Examiner.*